United States Patent
Lakshmanan et al.

(10) Patent No.: US 10,279,933 B2
(45) Date of Patent: May 7, 2019

(54) ANDROGYNOUS COUPLING DEVICE FOR CONNECTING MODULES, AND CORRESPONDING MODULES

(71) Applicant: Rheinisch-Westfälische Technische Hochschule (RWTH) Aachen, Aachen (DE)

(72) Inventors: Martin Anand Lakshmanan, Aachen (DE); Marc André Adomeit, Essen (DE); Patric Seefeldt, Sottrum (DE); Viktor Reimer, Aachen (DE)

(73) Assignee: Rheinisch-Westfälische Technische Hochschule (RWTH) Aachen, Aachen (DE)

( * ) Notice: Subject to any disclaimer, the term of this patent is extended or adjusted under 35 U.S.C. 154(b) by 250 days.

(21) Appl. No.: 15/300,940

(22) PCT Filed: Mar. 30, 2015

(86) PCT No.: PCT/EP2015/056923
§ 371 (c)(1),
(2) Date: Sep. 30, 2016

(87) PCT Pub. No.: WO2015/150338
PCT Pub. Date: Oct. 8, 2015

(65) Prior Publication Data
US 2017/0015443 A1    Jan. 19, 2017

(30) Foreign Application Priority Data
Apr. 2, 2014 (DE) .......................... 10 2014 104 695

(51) Int. Cl.
*B64G 1/64* (2006.01)
*B64G 1/10* (2006.01)

(52) U.S. Cl.
CPC .................. *B64G 1/64* (2013.01); *B64G 1/10* (2013.01); *B64G 1/646* (2013.01); *B64G 2001/1092* (2013.01)

(58) Field of Classification Search
CPC ... B64G 1/64; B64G 1/646; B64G 2001/1092
See application file for complete search history.

(56) References Cited

U.S. PATENT DOCUMENTS 4,756,638 A * 7/1988 Neyret .................... E05B 9/084
403/261
5,104,070 A * 4/1992 Johnson ................. B64G 1/646
244/172.4
(Continued)

FOREIGN PATENT DOCUMENTS

CN       201971170       9/2011
EP       0196793 A1      10/1986
(Continued)

OTHER PUBLICATIONS

International Search Report for PCT/EP2015/056923; dated Jun. 8, 2015; 3 pages.
(Continued)

*Primary Examiner* — Brian M O'Hara
*Assistant Examiner* — Keith L Dixon
(74) *Attorney, Agent, or Firm* — Reising Ethington, P.C.

(57) ABSTRACT

The invention relates to an androgynous coupling device (10) for connecting modules, in particular for constructing a spacecraft of modular design, wherein, in order to connect the modules, the coupling device (10) can be coupled to an identically constructed further androgynous coupling device and has a plurality of coupling elements (30, 32). It is provided that the androgynous coupling device (10) has a covering element (18) which covers the coupling elements (30, 32) in a passive state of the coupling device (10), wherein a first of the coupling elements (30) can be moved (Continued)

outwardly through the covering element (18) for active coupling to the identically constructed further coupling device. The invention furthermore relates to a module, in particular a module for constructing a spacecraft of modular design, having at least one such coupling device (10).

10 Claims, 1 Drawing Sheet

(56) References Cited

U.S. PATENT DOCUMENTS

| | | | | |
|---|---|---|---|---|
| 5,145,130 | A * | 9/1992 | Purves | B25J 5/00 244/159.4 |
| 6,354,540 | B1 * | 3/2002 | Lewis | B64G 1/646 244/172.4 |
| 6,547,476 | B2 * | 4/2003 | Kaszubowski | B64G 1/641 244/158.1 |
| 7,543,779 | B1 * | 6/2009 | Lewis | B64G 1/646 244/159.4 |
| 7,815,149 | B1 * | 10/2010 | Howard | B64G 1/646 244/172.4 |
| 9,086,087 | B1 * | 7/2015 | Sharman | A63H 33/067 |
| 9,231,323 | B1 * | 1/2016 | Jaeger | F16L 37/002 |
| 9,302,793 | B2 * | 4/2016 | Ghofranian | B64G 1/646 |
| 2004/0201215 | A1 | 10/2004 | Steingass | |
| 2006/0278765 | A1 * | 12/2006 | Strack | B64G 1/646 244/172.4 |

FOREIGN PATENT DOCUMENTS

| | | |
|---|---|---|
| JP | 2012145174 A | 8/2012 |
| RU | 2059542 C1 | 5/1996 |
| RU | 2291821 C1 | 1/2007 |

OTHER PUBLICATIONS

K. Bushuev, Docking technique, Moscow, Pravda Publishers, 1973, No. 4, pp. 10-13, Figs. 2, 3.

* cited by examiner

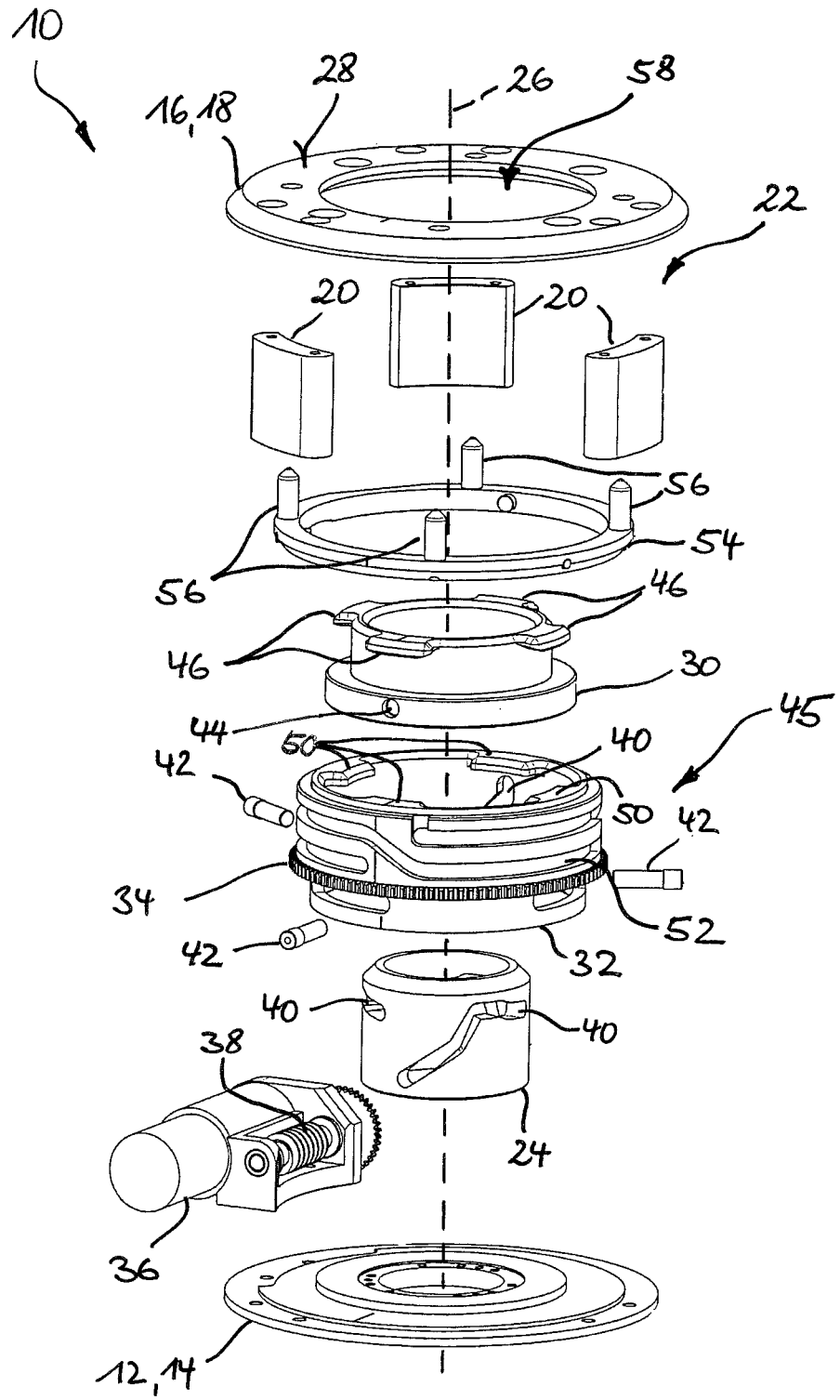

ANDROGYNOUS COUPLING DEVICE FOR CONNECTING MODULES, AND CORRESPONDING MODULES

The invention relates to an androgynous coupling device for connecting modules, in particular for constructing a spacecraft of modular construction, wherein the coupling device can be coupled to a further androgynous coupling device of identical construction for the purpose of connecting the modules and, to this end, has a plurality of coupling elements. The invention further relates to a module, in particular a module for constructing a spacecraft of modular construction, comprising at least one coupling device of this kind.

EP 0 196 793 A1 describes a satellite of modular construction, the modules of said satellite having androgynous coupling devices for connecting the individual modules to one another. Each of these androgynous coupling devices is designed to be coupled to and connected to a coupling device of identical construction of another module and, to this end, has a plurality of coupling elements. An androgynous coupling device of this kind (androgynous interface) for satellite systems which can be serviced in orbit allows reconfiguration of a modular satellite system, which is composed of components, by robotic manipulation.

Satellite systems which are currently in operation can be serviced in orbit only in rare exceptional cases and in these cases are dependent on the use of manned space missions. An economically and technically justifiable use of missions of this kind is limited to a few space projects. Robot-based servicing in orbit (so-called on-orbit servicing) is not established, inter alia, since the existing coupling devices allow connection of the modules only with a fixedly prescribed convergence routine.

The object of the present invention is to specify an androgynous coupling device and a module comprising an androgynous coupling device of this kind, which coupling device and module permit a convergence routine with an increased number of degrees of freedom.

The object is achieved by the features of the independent claims. Advantageous refinements are specified in the dependent claims.

The androgynous coupling device according to the invention has a covering element which covers the coupling elements in a passive state of the coupling device, wherein a first of the coupling elements can be displaced outward through the covering element for the purpose of active coupling to the further coupling device of identical construction.

Robot-assisted servicing of satellites, in this case in particular replacement of defective modules and also technically necessary system reconfiguration operations, during operation in outer space is possible owing to an androgynous coupling device of this kind. The modules can be detached and connected by robots owing to the androgynous interface which can be recessed, wherein the actual coupling operation takes place in an automated manner by means of the coupling elements. In this case, the use of the robot is restricted solely to manipulation of the satellite modules in order to orient said satellite modules with respect to one another. On account of its androgynous design, each new coupling device can be connected to any desired existing coupling device. The ability to detach the connection, even in the event of failure of a coupling partner, is ensured by the redundant design of the coupling mechanism.

Therefore, any module of the satellite system can be replaced as often as required over the course of the mission by means of "on-orbit servicing" with the aid of the androgynous coupling device according to the invention. The service life of the modular satellite is considerably increased as a result.

In addition to the positive aspects mentioned above, the specific structural realization of the coupling device comprising few components has advantages in respect of economical and functional requirements, in particular a low level of probability of failure.

According to a preferred embodiment of the invention, it is provided that an aperture is formed in the covering element, said aperture allowing a corresponding first coupling element, which is displaced outward, of the further androgynous coupling device of identical construction to enter a region behind the covering element, wherein a second of the coupling elements, which is permanently covered by the covering element, of the coupling device is arranged in this region for the purpose of forming a force-fitting and/or interlocking connection with the first coupling element, which is moved into the region, of the further coupling device of identical construction. In a preferred refinement of the invention, the inherent first coupling element of the coupling device can be displaced outward through precisely said aperture for the purpose of active coupling to the identical further coupling device.

According to a further preferred refinement of the invention, it is provided that both the first coupling element and the second coupling element can be displaced for the purpose of fixing the connection and also for the purpose of detaching the connection to the respectively other coupling element of the further androgynous coupling device of identical construction. In particular, the connection can therefore be detached by means of the first coupling element and by means of the second coupling element. It is therefore possible to establish the connection by operating the first coupling element of one coupling device which is involved and to detach the connection again by operating the second coupling element of the other coupling device which is involved.

According to a further preferred refinement of the invention, the connection is made by a bayonet fitting-like plug-and-turn movement. The connection is then detached by a corresponding turn-and-pull movement. The displacement operation for the purpose of fixing the connection (or for the purpose of detaching the connection) is then twisting of the first and/or of the second coupling element.

According to a further preferred refinement of the invention, it is provided that the covering element provides a substantially planar outer surface, in particular is in the form of a covering plate, which may have one or more apertures.

According to a yet further preferred embodiment of the invention, it is provided that the androgynous coupling device has a plurality of pins which can be partially extended out of the covering element and which can enter recesses, which are formed in the covering element of the further coupling device, for the purpose of fixing the further coupling device to the coupling device in a rotationally fixed manner. Accidental twisting of the two coupling devices with respect to one another is suppressed in this way.

According to a yet further preferred embodiment of the invention, it is provided that the first coupling element has a plurality of rear-engagement elements which point outward, and the second coupling element has an annular base having a plurality of rear-engagement elements which point inward. A construction of this kind is not uncommon in a bayonet fitting-like closure.

It is further advantageously provided that the androgynous coupling device further has (i) a base element, in particular a base plate, (ii) a linear guide element, which is fastened to the base element, for guiding the displacement movement of the first coupling element, and (iii) a drive of the coupling device comprising a drive motor.

Finally, it is advantageously provided that the drive has a slotted guide arrangement which converts the rotary movement of the drive motor into the movement sequence of the coupling elements or at least of the first coupling element. The main movement in this process is the bayonet fitting-like plug-and-turn movement of the first coupling element. In a particular embodiment, the extension and entry of the pins is also driven by means of the slotted guide arrangement.

In the module according to the invention comprising the at least one coupling device, it is provided that this coupling device is in the form of a coupling device as described above. It goes without saying that, purely in principle, the module can be a module for constructing any desired apparatus of modular construction. However, the module is preferably a module for constructing a spacecraft of modular construction, in particular a satellite of modular construction.

Finally, the invention also relates to a spacecraft of modular construction, in particular a satellite of modular construction, comprising modules as described above.

An exemplary embodiment of the invention will be explained in greater detail below with reference to a drawing, in which the figure shows an exploded illustration of an androgynous coupling device for a module for constructing a spacecraft of modular construction according to a preferred embodiment of the invention.

The single figure shows an exploded illustration of an androgynous coupling device 10 of a module (itself not shown) for constructing a spacecraft of modular construction, more precisely a satellite of modular construction. The androgynous coupling device 10 has a base plate 14 as the base element 12, the further components of the coupling device 10 being fitted on said base plate. A covering element 18, which is in the form of a cover plate 16, of the coupling device 10 is fastened to the base element 12 by means of spacer elements 20, so that an (inner) region 22 of the coupling device 10 is formed between the base element 12 and the covering element 18, said region being more or less covered to the outside by the covering element 18. In the example shown, the base plate 14 and the covering plate 16 are each in the form of circular disks which are arranged plane-parallel in relation to one another. The further components are then arranged on that side of the base element 12 or of the base plate 14 which faces the covering element 18. A sleeve-like linear guide element 24, which extends in the direction of the covering element 18 by way of its longitudinal axis 26, is arranged directly on the centre of the base element 12. This longitudinal axis 26 runs perpendicular to the outer surface 28 which is formed by the covering element 18 and coincides with the corresponding axes of symmetry of the base and cover plate 14, 16 which are in the form of circular disks. The interior of the sleeve-like linear guide element 24 forms an expansion opening for further interfaces for network connection, data connection, hydraulic and/or pneumatic connection of the modules which are involved to one another. The sleeve-like linear guide element 24 is surrounded by likewise sleeve-like coupling elements 30, 32 which are interleaved one in the other. In this case, the linear guide element 24 is circumferentially surrounded directly by a first coupling element 30 which, for its part, is circumferentially surrounded by a second coupling element 32. The second coupling element 32 has, on its casing outer surface, a spur wheel 34 which can be driven or is driven in rotation by means of a drive motor 36, which is fastened to the base element 12, and a worm gear mechanism 38, which is connected downstream of the drive motor 36. Guide paths 40 in the form of slots of a prespecified profile are formed both in the linear guide element 24 and in the second coupling element 32, guide pins 42, which are guided through (precisely fitting) apertures 44 in the first coupling element 30, being guided in said guide paths.

Therefore, the paths 40 in the second coupling element 32, which is driven by the drive motor 36, move relative to the paths 40, which are fixed to the base element, in the linear guide element 24 and generate, by means of the resulting movement of the pins 42, a combined translatory/rotary movement of the first coupling element 30. This movement is substantially in the manner of a bayonet fitting-type closure. The guide paths 40 and the guide pins 42 form a slotted guide arrangement 45 which converts the rotary movement of the drive motor 36 into the movement sequence of the first coupling element 30.

At its end which faces the covering element 16, the first coupling element 30 has a plurality of (precisely four in the example shown) rear-engagement elements 46, which point outward, distributed over the circumference. That end of the second coupling element 32 which faces the covering element 16 forms an annular base 48 with a plurality of rear-engagement elements 50 which point inward. Furthermore, guide paths 52, which are formed by slots, for the tiller, which faces inward, of a pin ring 54 comprising a plurality of (precisely four in the example shown) pins 56 are located on the outer casing surface of the second coupling element 32, said pins being guided into corresponding apertures in the covering element 16 and being able to move outward through these apertures. The guide paths 52 and the tiller form a further slotted guide arrangement 45 which converts the rotary movement of the drive motor 36 into the movement sequence of the pins 56.

The functioning of the androgynous coupling device 10 will now be described in the text which follows, wherein this coupling device always interacts with a further androgynous coupling device of identical construction for coupling purposes, wherein this further coupling device is not illustrated and therefore has to be mentally added.

First, the modules which are involved are arranged such that the surfaces 28 of the covering elements of the coupling devices 10 of said modules lie one on the other such that the axes 26 of said coupling devices are in alignment. Automatic coupling then takes place.

Case 1: the androgynous coupling device 10 under consideration in the form of an active coupling device.

In a manner driven by the drive motor 36, the pins 56 are extended by means of the guide paths 52 and the tiller of the pin ring 54 and engage in recesses in the covering element of the further androgynous coupling device. The two coupling devices and, respectively, the modules which are involved are secured against twisting in this way. The first coupling element 30 then moves out of the covering element 16 of its own coupling device 10 through an aperture 58 which is formed in the covering element 16 and, through a corresponding aperture in the covering element of the further coupling device 10, enters the region behind this covering element, where the second coupling element of this further coupling device 10 is located. The first coupling element 30 of the coupling device 10 shown is then twisted, so that the rear-engagement elements 46 engage behind the rear-engagement elements of the second coupling element of the further coupling device 10. An interlocking and force-fitting connection is produced by corresponding run-on bevels.

In order to detach the coupling/connection, either the first coupling element 30 of the coupling device 10 shown can then be moved back or the second coupling element of the further coupling device is then twisted.

Case 2: the androgynous coupling device 10 under consideration in the form of a passive coupling device.

The pins of the further coupling device are extended and engage in recesses in the covering element 16 of the androgynous coupling device shown. The first coupling element of the further coupling device moves along the axis 28 through the aperture 58 in the covering element 16 into the covered region 22 of the coupling device 10 shown, where the second coupling element 32 is located. The first coupling element of the further coupling device is then rotated, so that the rear-engagement elements of said first coupling element engage behind the rear-engagement elements 50 of the second coupling element 32 of the coupling device 10 shown. An interlocking and force-fitting connection is produced by corresponding run-on bevels.

In order to detach the coupling/connection, either the first coupling element of the further coupling device can then be moved back or the second coupling element 32 of the coupling device 10 shown is then twisted.

LIST OF REFERENCE SYMBOLS

10 Coupling device, androgynous
12 Base element
14 Base plate
16 Cover plate
18 Covering element
20 Spacer element
22 Region
24 Linear guide element
26 Longitudinal axis
28 Outer surface (covering element)
30 Coupling element, first
32 Coupling element, second
34 Spur wheel
36 Drive motor
38 Worm gear mechanism
40 Guide path
42 Guide pin
44 Aperture
45 Slotted guide arrangement
46 Rear-engagement element ($1^{st}$ coupling element)
48 Base, annular
50 Rear-engagement element ($2^{nd}$ coupling element)
52 Guide path
54 Pin ring
56 Pin
58 Aperture

The invention claimed is:

1. An androgynous coupling device (10) for connecting modules, in particular for constructing a spacecraft of modular construction, wherein the coupling device (10) is configured to be coupled to a further androgynous coupling device of identical construction for the purpose of connecting the modules and has a plurality of coupling elements (30, 32) as well as a covering element (18), which covering element (18) provides an outer surface (28), and in which covering element (18) one or more apertures (58) are formed, wherein the covering element (18) covers the coupling elements (30, 32) in a passive state of the coupling device (10), wherein a first of the coupling elements (30) is configured to be displaced outward through the covering element (18) for the purpose of active coupling to the further coupling device of identical construction, wherein the aperture (58) or one of the apertures (58) is configured to allow a corresponding first coupling element of the further androgynous coupling device of identical construction, which is displaced outward to enter a region (22) behind the covering element (18), wherein a second of the coupling elements (32) of the coupling device (10), which is permanently covered by the covering element (18), is arranged in this region (22) and arranged to form a force-fitting and/or interlocking connection with the first coupling element, which is moved into the region (22), of the further coupling device of identical construction.

2. The coupling device as claimed in claim 1, wherein the first coupling element (30) and the second coupling element (32) can be displaced for the purpose of fixing the connection and also for the purpose of detaching the connection to the respectively other coupling element of a further androgynous coupling device of identical construction.

3. The coupling device as claimed in claim 1, wherein the connection is made by a bayonet fitting-like plug-and-turn movement.

4. The coupling device as claimed in claim 1, wherein the outer surface (28) of the covering element (18) is a substantially planar outer surface (28), the covering element being in the form of a cover plate (16).

5. The coupling device as claimed in claim 1, wherein a plurality of pins (56) which can be partially extended out of the covering element (18) and which can enter recesses, which are formed in the covering element of the further coupling device, for the purpose of fixing the further coupling device to the coupling device (10) in a rotationally fixed manner.

6. The coupling device as claimed in claim 1, wherein the first coupling element (30) has a plurality of rear-engagement elements (46) which point outward, and the second coupling element (32) has an annular base (48) having a plurality of rear-engagement elements (50) which point inward.

7. The coupling device as claimed in claim 1, wherein
a base element (12), in particular a base plate (14),
a linear guide element (24), which is fastened to the base element (12), for guiding the displacement movement of the first coupling element (30), and
a drive (36, 38, 44) of the coupling device (10) comprising a drive motor (36).

8. The coupling device as claimed in claim 7, wherein the drive (36, 38, 44) further has a slotted guide arrangement (38, 45) by means of which a rotary movement of the drive motor (36) is converted into the movement sequence of the coupling elements (30, 32) or at least of the first coupling element (30).

9. The coupling device as claimed in claim 8, characterized in that the covering element (18) is fastened to the base element (12) by means of spacer elements (20).

10. A module, in particular a module for constructing a spacecraft of modular construction, comprising at least one coupling device (10) as claimed in claim 1.

* * * * *